(12) United States Patent
Gailledrat et al.

(10) Patent No.: US 9,452,850 B2
(45) Date of Patent: Sep. 27, 2016

(54) DEVICE FOR CONTROLLING THE LEVEL OF RESIN FOR FILLING A DETECTOR HAVING A ZONE THAT IS NOT TO BE FILLED

(75) Inventors: Joel Gailledrat, Champniers (FR); Philippe Doumalin, Gond-Pontouvre (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 297 days.

(21) Appl. No.: 14/239,880

(22) PCT Filed: Aug. 23, 2012

(86) PCT No.: PCT/EP2012/006418
§ 371 (c)(1),
(2), (4) Date: Feb. 20, 2014

(87) PCT Pub. No.: WO2013/030086
PCT Pub. Date: Mar. 7, 2013

(65) Prior Publication Data
US 2014/0202589 A1    Jul. 24, 2014

(30) Foreign Application Priority Data

Sep. 1, 2011 (FR) .................................. 11 57709

(51) Int. Cl.
B65B 1/20 (2006.01)
B65B 3/26 (2006.01)
G01D 11/24 (2006.01)
B29C 31/04 (2006.01)

(52) U.S. Cl.
CPC ............... *B65B 3/26* (2013.01); *G01D 11/245* (2013.01); *B29C 31/04* (2013.01)

(58) Field of Classification Search
CPC ...... B29C 31/04; G01D 11/2345; B65B 3/26
USPC .............................................. 141/80; 174/521
See application file for complete search history.

(56) References Cited

U.S. PATENT DOCUMENTS

| 5,293,002 A | 3/1994 | Grenet et al. |
|---|---|---|
| 5,605,656 A | 2/1997 | Sasano |
| 5,811,798 A | 9/1998 | Maurin et al. |
| 2007/0161268 A1 | 7/2007 | Muschketat |
| 2010/0064788 A1* | 3/2010 | Hofler .................. G01D 11/245 73/121 |

FOREIGN PATENT DOCUMENTS

| EP | 0 505 271 | 9/1992 |
|---|---|---|
| EP | 0 787 974 | 8/1997 |
| WO | 90/15709 | 12/1990 |

OTHER PUBLICATIONS

International Search Report Issued Jan. 22, 2013 in PCT/EP12/066418 filed Aug. 23, 2012.

* cited by examiner

*Primary Examiner* — Jason K Niesz
(74) *Attorney, Agent, or Firm* — Oblon, McClelland, Maier & Neustadt, L.L.P

(57) ABSTRACT

A device including a base body and a resin feed device to fill the base body with resin. The base body includes an area not to be filled by the resin and an opening at a level of an upper end, the area not to be filled being situated at the upper end of the base body and extending inside the base body. The resin feed device includes an injection column coinciding with the opening and extending inside the base body so that, during the filling, resin enters the interior of the base body via the injection column. The injection column extends more deeply inside the base body than the area to be filled, wherein when, during the filling, the resin reaches the injection column, air trapped in the base body is compressed, whereby the filling is stopped automatically, so that the area not to be filled is not filled.

17 Claims, 3 Drawing Sheets

DEVICE FOR CONTROLLING THE LEVEL OF RESIN FOR FILLING A DETECTOR HAVING A ZONE THAT IS NOT TO BE FILLED

TECHNICAL FIELD OF THE INVENTION

The present invention relates to products, in particular parameterable detectors, the mechanical strength and the seal of which are reinforced by filling their base body with resin. To be more precise, the present invention concerns the filling of a body with resin, preferably by a so-called "centrifuging" technique, said body including an area not to be filled, i.e. not to be buried in resin, typically because it includes electronic components. The device of the invention thus enables such a body to be filled and said filling to be stopped automatically so that the area not to be filled is effectively not filled with resin.

PRIOR ART

In known manner, the base body of products such as parameterable detectors are embedded in resin to guarantee high mechanical strength and to seal them. In this context, non-parameterable products are generally totally filled with resin whereas in the case of parameterable products, including, in their base body, electronic components—light-emitting diodes, adjustment components, switches—the injected resin must not in any circumstances come into contact with said electronic components.

However, known filling techniques, and in particular the centrifugal filling technique, do not enable automatic control of the level of filling of the base body. In the case of parameterable products where it is necessary to fill the base body with resin, a gravity filling technique is therefore used at present, which technique is complex and costly because it is necessarily of a one-off kind, delicate and carried out under the control of an operator.

The object of the invention is thus to propose a solution for filling base bodies of products such as parameterable detectors that may be totally automatic. The invention therefore concerns a device for feeding resin to the interior of a base body comprising an injection column for introducing the resin into the interior of said base body, preferably employing a centrifuging technique, the height of said injection column being configured so that the injection of resin into the base body stops automatically at a level such that an area comprising components that must not come into contact with the resin is not filled with the resin.

SUMMARY OF THE INVENTION

Accordingly, the invention concerns a device comprising a base body and a resin feed device fitted to said base body to fill said base body with resin, said base body comprising an area not to be filled that is not to be filled by the resin after the filling is completed, said base body comprising an opening at the level of an upper end, the area not to be filled being situated at said upper end of the base body and extending inside the base body, said resin feed device comprising an injection column coinciding with said opening and extending inside the base body so that, during the filling, resin gets into the interior of the base body via the injection column, the resin feed device being characterized in that the injection column extends more deeply inside said base body than the area not to be filled, to a distance configured so that when, during the filling, the resin reaches said injection column, air trapped in the base body is compressed in the area not to be filled until an equilibrium is established between the pressure of the air in the area not to be filled and the pressure of the resin in the injection column whereby the filling is stopped automatically, so that the area not to be filled is not filled.

The filling of said base body with resin is advantageously effected in accordance with a centrifuging technique so that, when the base body to which the resin feed device is fitted is subjected to a rotation movement, resin penetrates to the interior of the base body via the injection column because of the effect of centrifugal force.

The resin feed device may advantageously further comprise a removable pipette that can be connected to the injection column so that, during filling, resin penetrates to the interior of the base body via the pipette and the injection column.

In one embodiment the injection column is disposed within the mass of the base body.

In another embodiment the injection column is disposed in a body separate from the base body.

The invention also concerns a detector comprising a base body and a resin feed device as described above.

In this detector the area not to be filled advantageously contains an electronic component.

The area not to be filled may contain a light-emitting diode.

The area not to be filled may contain a communication device.

BRIEF DESCRIPTION OF THE FIGURES

Other features and advantage will become apparent in the course of the following detailed description with reference to the appended drawings, in which.

DETAILED DESCRIPTION

The invention concerns a device comprising a base body designed to be filled with resin except for an area not to be filled, for example because it contains electronic components. The device of the invention comprises a resin feed device designed to enable automatic filling fitted to the base body.

Figure 1:
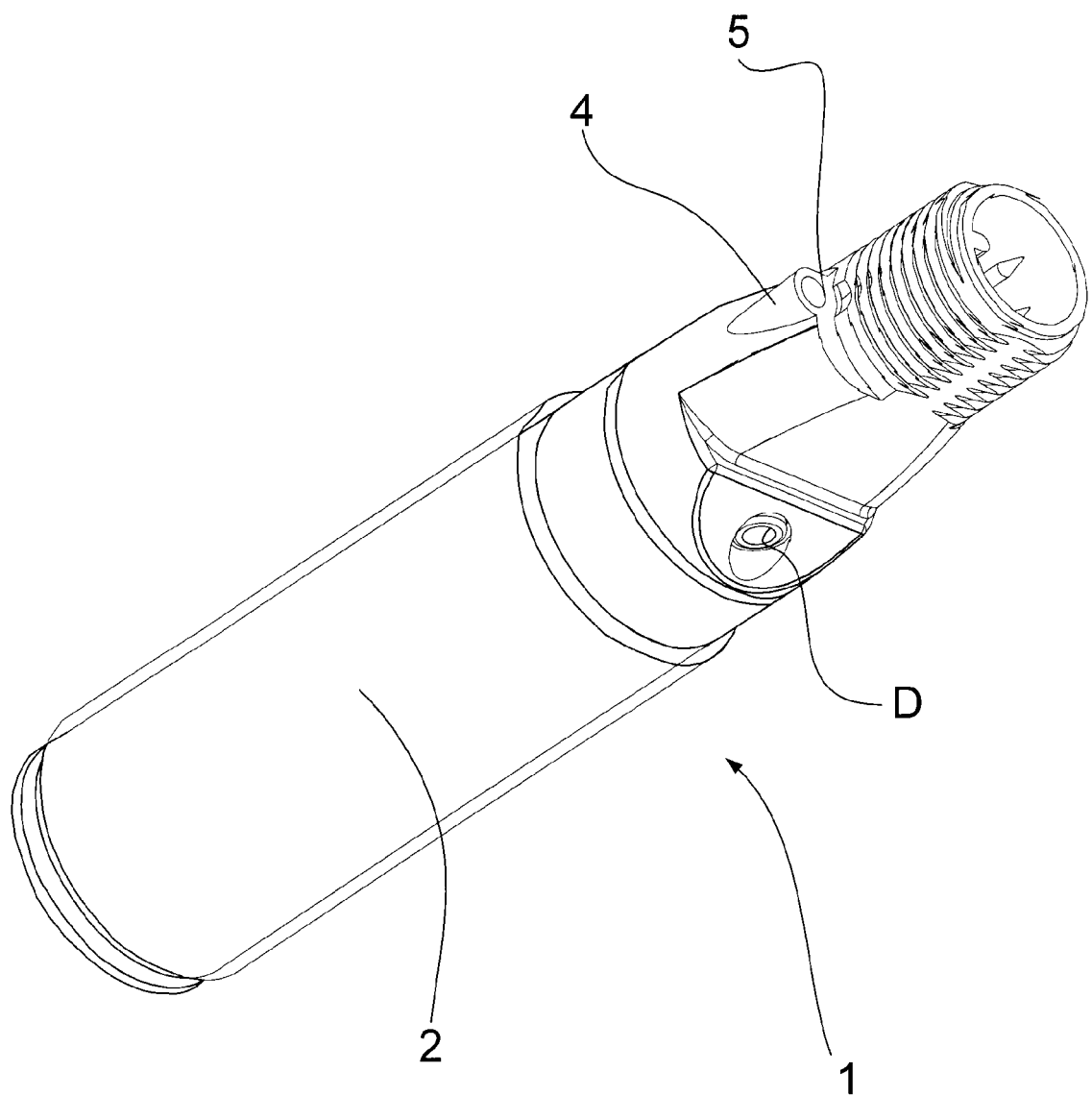
FIG. 1 is a diagram of a base body of a parameterable detector.
Figure 2:
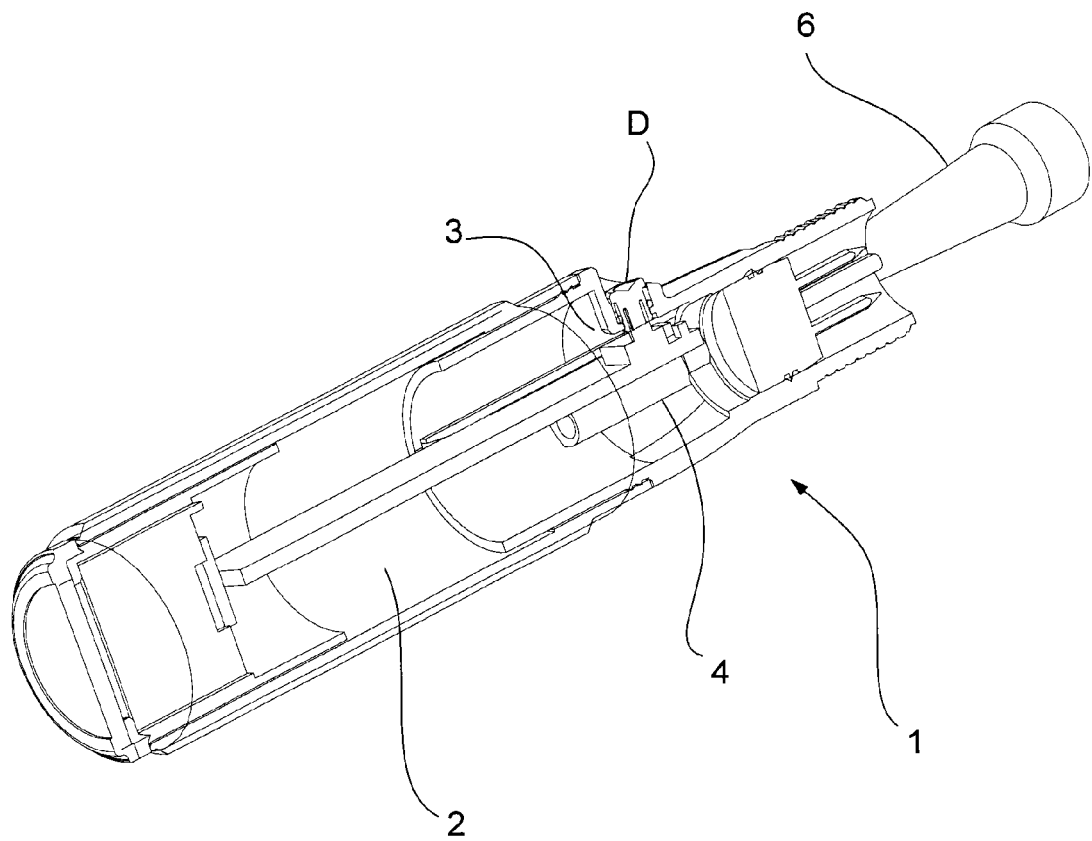
FIG. 2 is a sectional view of the resin feeding device of the invention fitted to a parameterable detector base body.

Referring to FIG. 1, the device of the invention is represented in the form of a parameterable detector 1. As can be seen in FIG. 2, the parameterable detector 1 comprises a base body 2 and an area 3 not to be filled. The area 3 not to be filled typically comprises, in the case of a parameterable detector, a diode D, a switch or electronic communication components.

The parameterable detector 1 further includes a resin feed device consisting of an injection column 4 and a pipette 6. As previously explained, some products, such as parameterable detectors 1, necessitate filling of their base body 2 with resin, except for the area 3 not to be filled, to reinforce their mechanical strength and their seal. The base body 2 is preferably filled by centrifuging. In this centrifugal filling technique, a set of products is disposed horizontally in a centrifuge and resin enters said products via the opening 5 and the injection column 4 to be pressed against the bottom of the base body 2, at the end opposite the opening 5. The centrifugal filling method is preferred as, because of the effect of the centrifugal force, there is a very low probability of air bubbles appearing in the resin, whereas such air bubbles, which are harmful, may appear in the case of gravity filling.

In any event, whatever way of filling the base body 2 with resin is chosen, said resin is fed into the product via the injection column 4.

According to the invention, in order not to fill the area 3 not to be filled, the level of filling of the base body 2 is adjusted automatically thanks to an appropriate configuration of the length of the injection column 4, which lies inside the base body 2, relative to the volume of the area 3 not to be filled. Accordingly, when filling the base body 2, as the resin penetrates into the parameterable detector 1, the air contained in the base body 2 is compressed and evacuated via the injection column 4. As shown in FIG. 2, the length of the injection column 4 is adjusted so that, when the level of the resin in the base body 2 reaches the bottom of the injection column 4, the air can only longer escape and is compressed in the area 3 not to be filled situated between the end of the injection column 4 inside the base body 2 and the upper end of the base body 2 incorporating the opening 5. Because of the effect of the force of gravity, or preferably the centrifugal force, the resin continues to penetrate into the parameterable detector 1 until the pressure of the air in the area 3 not to be filled and the pressure of the resin in the injection column 4 are equalized. The filling of the base body 2 is then stopped automatically.

Figure 3:
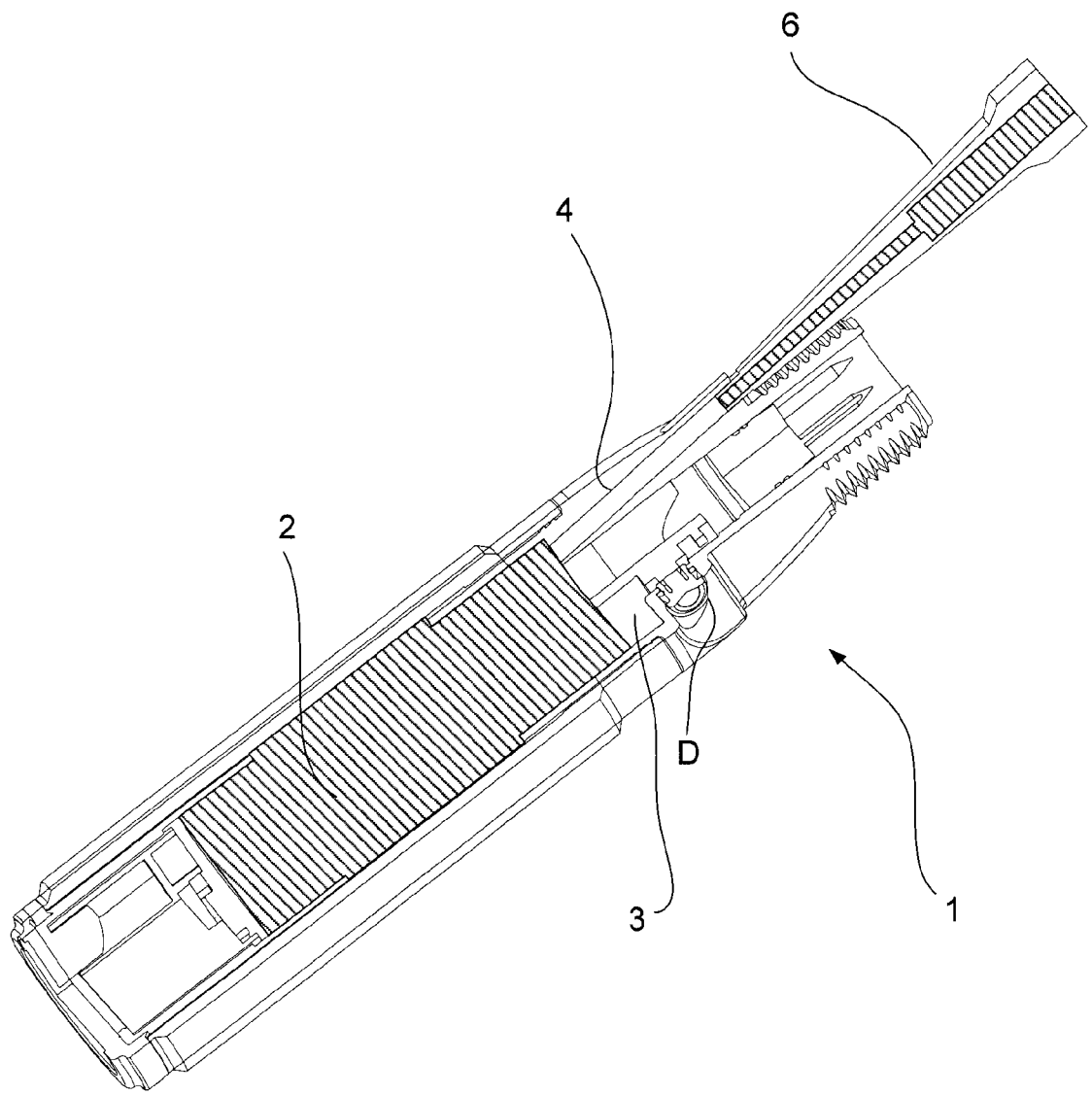
FIG. 3 is a view in section of a parameterable detector base body when filling with resin has been completed.

As shown in FIG. 3, in the preferred embodiment of the invention, the base body 2 is filled by centrifuging and a pipette 6 is fitted to the injection column 4 to complete the resin feed device of the invention, designed to feed the resin into the base body 2.

To summarize, the invention consists in a device comprising a base body to be filled with resin and an area not to be filled; to enable automatic stopping of filling when the resin has reached the required level, the present invention provides an injection column inside the product and having a length adjusted so that during filling of the base body with the resin a balance is automatically obtained between the pressure of the resin and the pressure of the air in the area not to be filled situated between the end of the injection column and the upper end of the base body after the resin has reached the end of said injection column and stops the filling of the base body.

The invention claimed is:

1. A device comprising:
a base body; and
a resin feed device fitted to the base body to fill the base body with resin;
the base body comprising an area not to be filled that is not to be filled by the resin after a filling is completed, the base body comprising an opening at a level of an upper end, the area not to be filled being situated at the upper end of the base body and extending inside the base body;
the resin feed device comprising an injection column coinciding with the opening and extending inside the base body so that, during the filling, resin gets into the interior of the base body via the injection column,
wherein the injection column extends more deeply inside the base body than the area not to be filled, to a distance configured so that when, during the filling, the resin reaches the injection column, air trapped in the base body is compressed in the area not to be filled until an equilibrium is established between pressure of the air in the area not to be filled and pressure of the resin in the injection column, whereby the filling is stopped automatically, so that the area not to be filled is not filled.

2. A device according to claim 1, the filling of the base body with resin being effected in accordance with a centrifuging technique so that, when the base body to which the resin feed device is fitted is subjected to a rotation movement, resin penetrates to the interior of the base body via the injection column because of effect of centrifugal force.

3. A device according to claim 1, the resin feed device further comprising a removable pipette that can be connected to the injection column so that, during filling, resin penetrates to the interior of the base body via the pipette and the injection column.

4. A device according to claim 1, wherein the injection column is disposed within a mass of the base body.

5. A device according to claim 1, wherein the injection column is disposed in a body separate from the base body.

6. A device according to claim 1, wherein the device is a detector.

7. A detector according to claim 6, wherein the area not to be filled includes an electronic component.

8. A detector according to claim 6, wherein the area not to be filled includes a light-emitting diode.

9. A detector according to claim 6, wherein the area not to be filled includes a communication device.

10. A device comprising:
a base body including
an area not to be filled by resin after a filling is completed; and
an opening at a level of an upper end, the area not to be filled being situated at the upper end of the base body and extending inside the base body; and
a resin feed device fitted to the base body to fill the base body with the resin, the resin feed device including an injection column coinciding with the opening and extending inside the base body so that resin enters the interior of the base body via the injection column during the filling, wherein
the injection column extends further inside the base body than the area not to be filled, to a distance configured so that when, during the filling, the resin reaches the injection column, air trapped in the base body is compressed in the area not to be filled until an equilibrium is established between pressure of the air in the area not to be filled and pressure of the resin in the injection column.

11. The device of claim 10, wherein
the filling of the base body with resin is effected in accordance with a centrifuging technique so that, when the base body to which the resin feed device is fitted is subjected to a rotation movement, resin penetrates to the interior of the base body via the injection column.

12. The device of claim 10, wherein
the resin feed device further comprises a removable pipette configured to be connected to the injection column so that, during filling, resin penetrates to the interior of the base body via the pipette and the injection column.

13. The device of claim 10, wherein
the injection column is disposed within a mass of the base body.

14. The device of claim 10, wherein
the injection column is disposed in a body separate from the base body.

15. The device of claim 10, wherein the area not to be filled includes an electronic component.

16. The device of claim 10, wherein the area not to be filled includes a light-emitting diode.

17. The device of claim 10, wherein the area not to be filled includes a communication device.

* * * * *